(12) United States Patent
Weber et al.

(10) Patent No.: US 10,295,097 B2
(45) Date of Patent: May 21, 2019

(54) COUPLING CONNECTION DEVICE COMPRISING LINE COUPLING CONNECTOR AND WIND GUARD

(71) Applicant: NORMA Germany GmbH, Maintal (DE)

(72) Inventors: Benjamin Weber, Aschaffenburg (DE); Viktor Stoll, Großkrotzenburg (DE); Thomas Petschl, Neuberg (DE); Stephan Mann, Biebergemünd (DE)

(73) Assignee: NORMA Germany GmbH, Maintal (DE)

( * ) Notice: Subject to any disclaimer, the term of this patent is extended or adjusted under 35 U.S.C. 154(b) by 0 days.

(21) Appl. No.: 15/747,300

(22) PCT Filed: May 24, 2016

(86) PCT No.: PCT/EP2016/061707
§ 371 (c)(1),
(2) Date: Jan. 24, 2018

(87) PCT Pub. No.: WO2017/025211
PCT Pub. Date: Feb. 16, 2017

(65) Prior Publication Data
US 2018/0216768 A1    Aug. 2, 2018

(30) Foreign Application Priority Data
Aug. 7, 2015   (DE) .......................... 10 2015 113 086

(51) Int. Cl.
*F16L 37/084*    (2006.01)
*F16L 53/38*     (2018.01)
(Continued)

(52) U.S. Cl.
CPC ........... *F16L 37/0848* (2013.01); *F16L 53/38* (2018.01); *F16L 57/00* (2013.01); *F16L 59/188* (2013.01); *H01R 13/516* (2013.01); *B60S 1/48* (2013.01)

(58) Field of Classification Search
CPC .. H01R 13/502; H01R 13/506; H01R 13/514; H01R 13/633; H01R 31/06
See application file for complete search history.

(56) References Cited

U.S. PATENT DOCUMENTS

| 7,307,219 B1 | 12/2007 | Dower et al. |
| 2007/0232116 A1 | 10/2007 | Bernat et al. |

(Continued)

FOREIGN PATENT DOCUMENTS

| DE | 202006005177 U1 | 6/2006 | |
| DE | 202009010037 U1 * | 12/2010 | ........... H01R 13/502 |

(Continued)

OTHER PUBLICATIONS

International Search Report for International Application No. PCT/EP2016/061707, dated Sep. 2, 2016.

(Continued)

*Primary Examiner* — Timothy J Thompson
*Assistant Examiner* — Amol H Patel
(74) *Attorney, Agent, or Firm* — Marshall, Gerstein & Borun LLP

(57) ABSTRACT

A coupling connection device includes a line coupling connector and a wind guard. The line coupling connector has first and second coupling elements, fitted together in an axial direction. Arresting means of the first coupling element engage with the second coupling element. The wind guard has a plastic shell with a first part-shell and a second part-shell, enclosing a receiving space, and forming first and second line openings, which connect the receiving space to (Continued)

the surrounding region. The first coupling element is coupled in an axially fixed manner in the axial direction to the first part-shell and/or the second part-shell in the receiving space by interlocking engagement. By a movement of the wind guard in the axial direction and away from the second coupling element, an arresting means can be actuated and the first coupling element can be separated from the second coupling element.

15 Claims, 2 Drawing Sheets

(51) Int. Cl.
*F16L 57/00* (2006.01)
*F16L 59/18* (2006.01)
*H01R 13/516* (2006.01)
*B60S 1/48* (2006.01)

(56) References Cited

U.S. PATENT DOCUMENTS

| 2010/0264647 | A1 | 10/2010 | Gange et al. |
| 2012/0038118 | A1* | 2/2012 | Yin ..................... H01R 13/506 |
| | | | 277/630 |

FOREIGN PATENT DOCUMENTS

| DE | 202009010037 U1 | 12/2010 |
| DE | 102013105602 A1 | 12/2014 |
| EP | 2418744 A1 | 2/2012 |
| GB | 1413650 A | 11/1975 |

OTHER PUBLICATIONS

First Office Action for German Application No. 10 2015 113 086.6, dated May 20, 2016.

* cited by examiner

COUPLING CONNECTION DEVICE COMPRISING LINE COUPLING CONNECTOR AND WIND GUARD

CROSS-REFERENCE TO RELATED APPLICATIONS

This is the United States national phase of International Patent Application No. PCT/EP2016/061707, filed May 24, 2016, which claims the priority benefit of German Application No. 102015113086.6, filed Aug. 7, 2015, the entire content of each of which is incorporated herein by reference.

BACKGROUND

Coupling connection devices serve for the coupling connection of two conductor portions to a coupling connector, wherein a first coupling element forms the end of the first conductor portion and a second coupling element forms the end of the second conductor portion. The conductor portions may be electrical and hydraulic conductors. Frequently, for example in automobile construction, electrical conductors and hydraulic conductors are also combined in a conductor harness. This includes the washer-fluid lines that are integrated in cable harnesses.

In particular in a cold environment and in the event of wind bombardment, for example in the vehicle or aircraft, the coupling connector is susceptible to damage, for example by freezing of the fluid in a hydraulic conductor. In order to prevent this, coupling connectors are packaged with wind guards. In addition, line coupling connectors generally comprise hard materials and, when vibrations occur, may generate rattling and knocking noises by colliding with other line coupling connectors or peripheral components. Even this can be prevented with wind guards.

In the prior art, in particular in vehicle construction, wind guard tubes are used as wind guards. These flexible wind guard tubes are pushed over the line coupling connectors, for which purpose they usually first have to be pushed onto one of the conductor portions to be connected while the line coupling connectors are open. A disadvantage of this is that they can only poorly position electrical cables, including the line coupling connectors, and also hydraulic line coupling connectors. There is the risk of noises, for example rattling noises, occurring as a result. Furthermore, wind guard tubes partly lie against the line coupling connector, as a result of which cold bridges are formed. Fluids in hydraulic connectors can thereby freeze, or at least become very viscous.

A further disadvantage is that of uncontrolled installation. The wind guard tube is first brought approximately into position, and then usually a cable tie is tightened around the ends. The tightening torque is scarcely predeterminable, and therefore either air gaps are left or conductors are pinched. Depending on how bunches of conductors happen to turn out, the connection may loosen again later and the wind guard tube slip. Furthermore, during installation and removal, the ends of the tubes have to be turned back, which requires manual dexterity and time. In the case of maintenance, it is disadvantageous that the wind guard tube has to be pushed back in order to get to the individual line coupling connectors.

Alternative protection of at least one electrical connector is disclosed by U.S. Pat. No. 7,307,219 B1, according to which two half-shells are used, forming a casing with an interior cavity when they are placed together. The openings of the half-shells are respectively spanned by an elastomer membrane. When the electrical connector is placed between the half-shells and the latter are closed, the two membranes are deformed around the electrical connector. It is disadvantageous that to realize this it is necessary for there to be a relatively large box around the electrical connector. If a plurality of line coupling connectors are placed between the membranes, the latter can in turn collide with one another and cannot be properly positioned in relation to one another. Furthermore, the membranes represent heat bridges, which lead from the housing casing directly to the electrical connector. The casing according to U.S. Pat. No. 7,307,219 B1 therefore tends to be unsuitable for multiple line coupling connectors or hydraulic connectors.

Furthermore, a casing consisting of two half-shells is disclosed by GB 1 413 650 A. The two half-shells exactly follow the geometry of the electrical conductors and connectors to be received. The half-shells are placed around them and then connected to each other by screws at a flanged edge. It is disadvantageous that there is a great heat bridge, and therefore this design is not suitable for hydraulic line coupling connectors at low temperatures.

A common feature of all of the known solutions is that, in the case of maintenance, the wind guard first of all has to be removed in order then to decouple the line coupling connector. This is frequently difficult because of the tight construction space in vehicles. Handling using standard tools, such as screwdrivers and pliers, is possible only to a restricted extent and can also lead to damage.

GENERAL DESCRIPTION

It is therefore the object to provide a maintenance-friendly device which is suitable for preventing the development of noise in the region of line coupling connectors and for protecting hydraulic line coupling connectors from low temperatures. In addition, the device is intended to be compact, able to be installed easily and correctly, and also to be inexpensive.

The invention relates to a coupling connection device comprising a line coupling connector and a wind guard. The line coupling connector has a first and second coupling element which are joined together in an axial direction. Locking means of the first coupling element are in engagement here with the second coupling element. The wind guard has a plastic shell with a first part-shell and a second part-shell, which lie opposite each other in a parting plane and surround a receiving space, and form a first and second line opening, which connect the receiving space to the surrounding region outside the receiving space. The first coupling element is coupled in the receiving space to the first part-shell and/or to the second part-shell in an axially fixed manner in the axial direction by means of a form fit. Actuating means are coupled here to the locking means in such a manner that, by means of a movement of the wind guard in the axial direction and also away from the second coupling element, the locking means are actuable, in particular with the actuating means, and the first coupling element can be separated from the second coupling element.

An advantage of this is that the plastic shell of the wind guard forms a removal tool for separating the line coupling connector. The wind guard already has a larger diameter than the inner coupling connector and can thus be gripped better. The adaptation of the plastic shell to the respective installation site can be realized substantially more simply here than arranging individual line coupling connectors at each installation site. At the same time, the wind guard also carries out its core tasks, namely permanent and exact positioning of the line coupling connector in the wind guard, formation of an insulating air cushion around the line coupling connector contour, and prevention of rattling noises, since the line coupling connector is located in a defined position in the wind guard and cannot collide with other components.

When assembled, the line coupling connector then forms a coupling connection between a first and a second conductor portion, wherein the first conductor portion is secured on the first coupling element and is guided out of the receiving space into the surrounding region through the first line opening, and the second conductor portion is secured on the second coupling element and is guided out of the receiving space into the surrounding region through the second line opening. The first and second conductor portions can be electrical conductor portions and/or hydraulic conductor portions. Whenever a conductor harness consisting of at least two conductors is provided, it is appropriate that the line coupling connector connects two hydraulic conductor portions to each other, and a second line coupling connector is arranged in the receiving space at a distance from the first line coupling connector. If only one of the line coupling connectors is intended to be opened with the aid of the wind guard, the second line coupling connector is mounted in a sliding manner on the wind guard. If the two line coupling connectors are intended to be decoupled simultaneously with the wind guard, the mounting of the second line coupling connector corresponds to that of the first.

According to a more detailed refinement of the coupling connection device, it is provided that the locking means are configured as holding springs, and the actuating means engage in the holding springs. This provides a coupling with which the holding springs can be released. A line coupling connector which has latching means, namely the holding springs, can therefore also be opened with the wind guard.

The actuating means can be formed, for example, by ribs, in particular by ribs which are oriented transversely with respect to the axial direction. The rib at the same time stiffens the part-shells and prevents the deformation thereof.

In a particular embodiment, the locking means comprise two opposite holding springs on the first coupling element, wherein a first actuating means is arranged on the first part-shell and engages in the first holding spring, and wherein a second actuating means is arranged on the second part-shell and engages in the second holding spring.

According to a specific variant of the coupling connection device, the wind guard is slidingly mounted on the first coupling element for the distance of an actuating path running in the axial direction, wherein, in a first end position of the actuating path, the locking means of the first coupling element are in engagement with the second coupling element, and wherein, in a second end position of the actuating path, the locking means of the first coupling element are not in engagement with the second coupling element. The effect achieved by this is that the locking means can completely close and are released only when there is a pull on the wind guard in the axial direction. The operation is thereby particularly simple.

The form fit between the wind guard and the first coupling element is intended to have such a large amount of play that the wind guard is slidingly mounted on the first coupling element for the distance of the actuating path running in the axial direction. In a first end position of the actuating path, the locking means of the first coupling element are then in engagement with the second coupling element. In a second end position of the actuating path, the locking means of the first coupling element are no longer in engagement with the second coupling element.

In a preferred refinement, the actuating means are slidingly mounted along the actuating path on the holding springs which are substantially oriented in the axial direction A, but form a rising ramp on the outer side in the direction away from the second coupling element. By the actuating means sliding over the ramp, the holding springs are pivoted about a rocker axis and the locking means lift from the second coupling element. The rocker axis is preferably configured as an elastic rib.

According to a specific embodiment, the ramp has depressions into which the actuating means spring. In particular, at least one depression is intended to be provided in the first end position. By this means, the wind guard is fixed in a defined position on the first coupling element in the first end position. Rattling noises are avoided and sealing elements are positioned correctly with respect to one another. A depression is preferably also provided in the second end position. The second end position can therefore also be detected haptically, and the locking means do not spring back into the locking position during removal. In addition, the first end position and the second end position can be detected haptically by the operator, and an actuating force is required in order to overcome the depressions.

In a preferred refinement, the second coupling element fits through the second line opening. The separation of the coupling elements can then be carried out completely without the wind guard having to be removed.

Furthermore, it is provided, in a detailed refinement, that when a coupling connection exists between the first and second coupling elements, the plastic shell is openable and closeable by a linear or rotating relative movement of the first and second part-shells in the plane perpendicular to the axial direction. Therefore, firstly, the line coupling connector which has already been put together can be inserted into the plastic shell and the latter can be closed. Secondly, an opening of the plastic shell is also possible where the line coupling connector is not opened at the same time.

In order to provide a high degree of thermal insulation, there is the option that the line coupling connector is held in the receiving space at a distance from the first part-shell and the second part-shell by an air gap. The air gap around the line coupling connector is preferably substantially uniform in size. The thermal insulation is therefore formed homogeneously in all directions.

The coupling connection device is handled comfortably if the first and second part-shells are coupled to each other via a rotary joint, which is oriented in the axial direction, and therefore the first and second part-shells can be swung open and swung shut relative to each other. The joint can be, for example, a film hinge. Such a joint is inexpensive.

Furthermore, the wind guard can optionally have actuable latching means with which the first and second part-shells are sealable to each other in order to form the receiving space. This permits a tool-free installation. Depending on the configuration, tool-associated or tool-free removal can be realized. The latching means preferably comprise first latching means on the first part-shell and second latching means on the second part-shell. The production is reasonably priced in particular if the first latching means are formed integrally, in particular monolithically, with the first part-shell, and the second latching means are formed integrally, in particular monolithically, with the second part-shell.

The plastic shell can optionally have a circumferential grip thickening relative to the axial direction. The wind guard can be grasped without a tool and the coupling connection released by pulling, in a correspondingly simple and ergonomic manner.

The coupling connection device is suitable in particular for variant embodiments in which the second coupling element is a positionally fixed connecting piece. The second line opening can be closed or covered here with a support element, for example a wall, of the connecting piece. This improves the thermal insulation.

In a preferred inexpensive refinement, the first actuating means is formed integrally, in particular monolithically, with the first part-shell. Easy and quick installation is accomplished in particular in accordance with an optional refinement in which the first and second line openings are arranged in the parting plane between the first and second part-shells.

Moreover, the first and second part-shells should follow the outer contour of the line coupling connector or of the line coupling connectors. This ideally produces an elongate wind guard which has the conductor openings at its ends. The maximum thickening of the wind guard preferably lies in the parting plane between the two part-shells. This facilitates installation by insertion of the line coupling connector or of the line coupling connectors.

In a variant of the wind guard, a seal is formed and/or arranged between the first part-shell and the second part-shell. This is accomplished by sealing surfaces lying mechanically against one another or by an elastic seal. Consequently, wind does not penetrate the wind guard. Seals, in particular elastic sealing sleeves, can also be provided in the region of the line openings.

In order to avoid rattling noises and in order to obtain a defined installation position, a supplement of the coupling connection device is appropriate to the effect that the plastic shell has a fastening means for securing to another component. Said fastening means can be, for example, a clip contour, a latching means or a tab with an opening.

In a particularly cold use environment, there is the option of inserting a coupling connection device in which an electrically operating heating element is arranged in the receiving space. This is preferably operated as frost protection heating in relation to the fluid that is present in the line coupling connector.

BRIEF DESCRIPTION OF THE DRAWINGS

Further features, details and advantages of the invention emerge from the wording of the claims and from the description below of exemplary embodiments on the basis of the drawings, in which:

DETAILED DESCRIPTION

Figure 1:
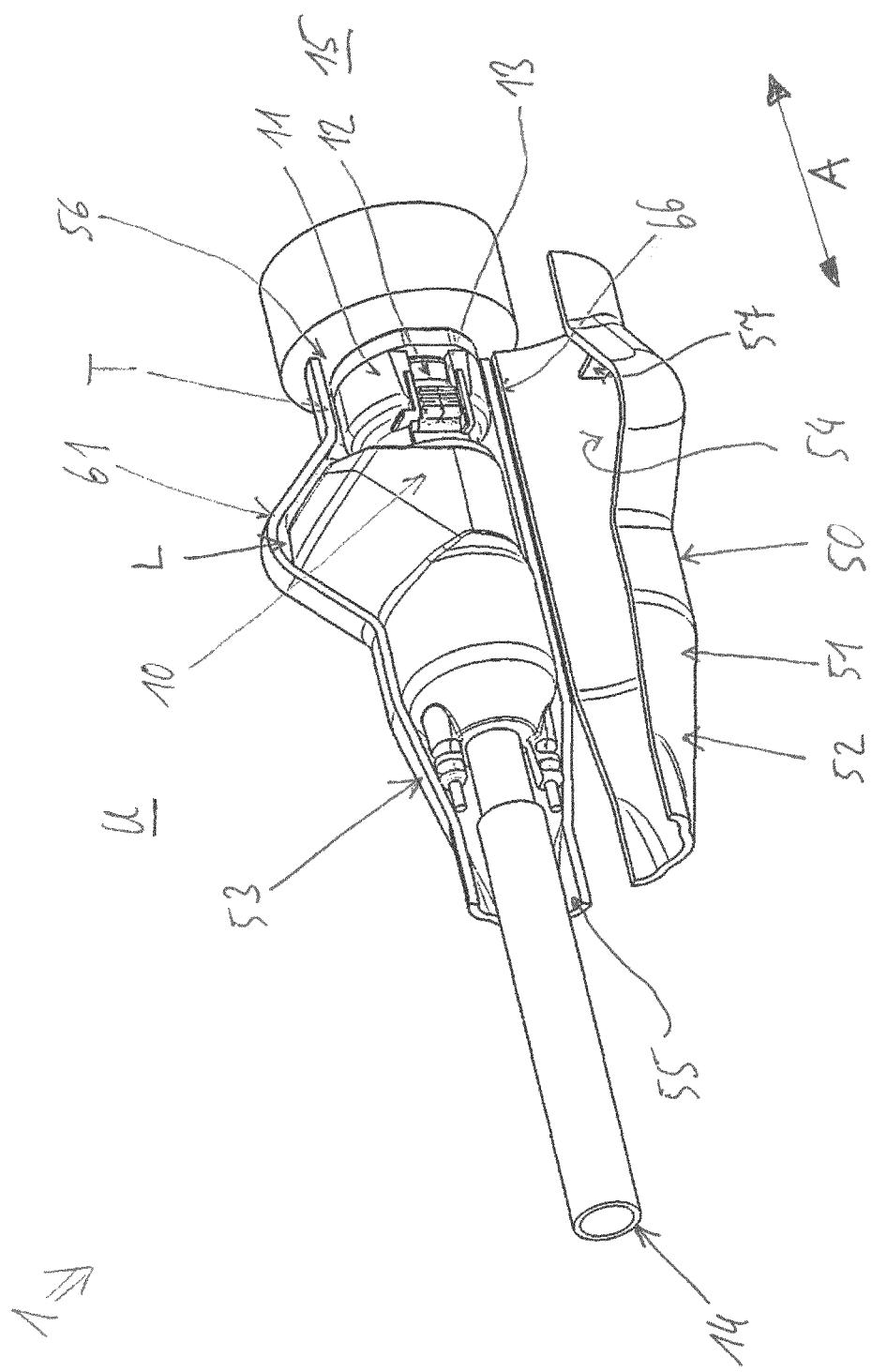
FIG. 1 shows a perspective view of a coupling connection device with a line coupling connector in an open wind guard.

FIG. 1 shows, in a perspective view, a coupling connection device 1 with a line coupling connector 10 in an open wind guard 50.

Figure 2:
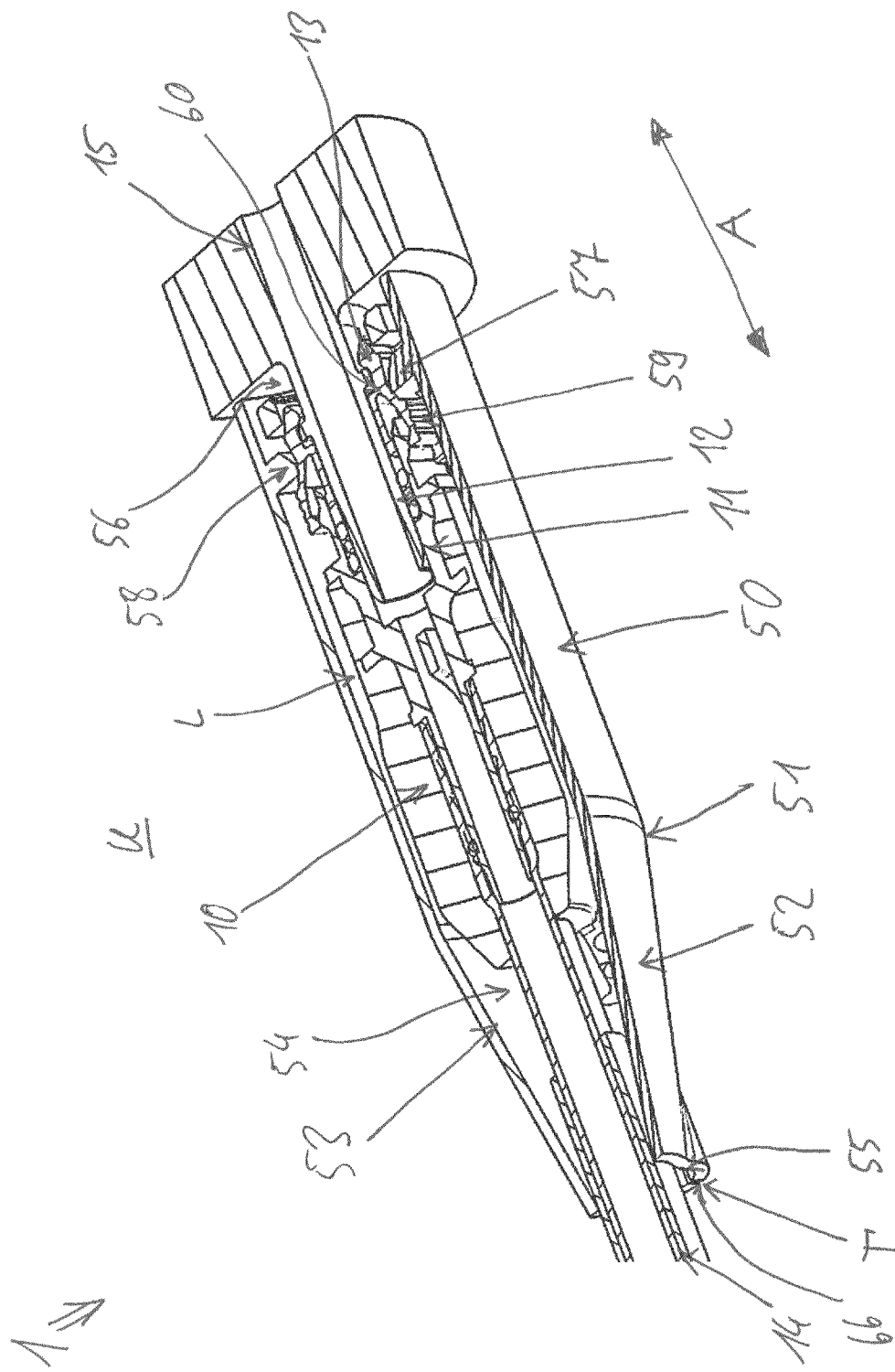
FIG. 2 shows a perspective view of a sectional half of the coupling connection device shown in FIG. 1 with a closed wind guard.

The wind guard 50 has a plastic shell 51 with a first part-shell 52 and a second part-shell 53. When the part-shells 52, 53 are closed, they lie opposite each other in a parting plane T and surround a receiving space 54. The closed position is shown in FIG. 2. The statements with regard to FIG. 1 therefore also apply to FIG. 2.

A first and second line opening 55, 56 are formed on the end side of the plastic shell 51 and are each arranged in the parting plane T. They connect the receiving space 54 to the surrounding region U.

The line coupling connector 10 consists of a first and a second coupling element 11, 12, which are coupled together in an axial direction A. It forms a coupling connection between a first and a second conductor portion 14, 15, wherein the first conductor portion 14 is secured to the first coupling element 11 and is guided out of the receiving space 54 into the surrounding region U through the first line opening 55, and the second conductor portion 15 is secured to the second coupling element 12 and is guided out of the receiving space 54 into the surrounding region U through the second line opening 56. The first and second conductor portions 14, 15 are hydraulic conductor portions. It is seen that the line coupling connector 10 is held in the receiving space 54 at a distance from the first part-shell 52 and the second part-shell 53 by an air gap L.

The first coupling element 11 is arranged in the receiving space 54 and is coupled to the first part-shell 52 and the second part-shell 53 in an axially fixed manner in the axial direction A by a form fit. This is revealed in particular from the contour according to FIG. 1.

It is seen that locking means 13 of the first coupling element 11 are in engagement with the second coupling element 12, in particular with an encircling collar on the second coupling element 12 (see FIG. 2 for this purpose).

For the ergonomic release of the locking means 13, actuating means 57, 58 are coupled to the locking means 13 in such a manner that, by movement of the wind guard 50 in the axial direction A and also away from the second coupling element 12, the locking means 13 are actuable and the first coupling element 11 can be separated from the second coupling element 12. The locking means 13 are holding springs, and the actuating means 57, 58 engage in the holding springs. In particular, the locking means 13 comprise two opposite holding springs on the first coupling element 11, wherein a first actuating means 57 is arranged on the first part-shell 52 and engages in the first holding spring, and wherein a second actuating means 58 is arranged on the second part-shell 53 and engages in the second holding spring. In particular, the actuating means 57, 58 slide over the holding springs which are oriented substantially in the axial direction A, but form a rising ramp 59 on the outer side in a direction away from the second coupling element 12. By the actuating means 57, 58 sliding over the ramp 59, the holding springs are pivoted about a rocker axis 60 and the locking means 13 lift from the second coupling element 12. The rocker axis 60 is configured as an elastic rib.

The first actuating means 57 is arranged on the first part-shell 52, in particular is produced integrally and monolithically therewith. It involves a rib which is oriented transversely with respect to the axial direction A. Equally, the second actuating means 58 is arranged on the second part-shell 53, in particular is produced integrally and monolithically therewith. It likewise involves a rib which is oriented transversely with respect to the axial direction A.

The form fit between the wind guard 50 and the first coupling element 11 has play, and therefore the wind guard 50 is slidingly mounted on the first coupling element 11 for the distance of an actuating path running in the axial direction A. In the shown first end position of the actuating path, the locking means 13 of the first coupling element 11 are in engagement with the second coupling element 12. In a second end position of the actuating path that is not illustrated specifically, the locking means 13 of the first coupling element 11 are no longer in engagement with the second coupling element 12. In order to arrive at said second end position, the actuating means 57, 58 slide up the ramps 59. The ramp 59 here has depressions into which the actuating means 57, 58 spring. By this means, the first end position and the second end position can be detected haptically by the operator, and an actuating force is needed in order to overcome the depressions. By this means, the wind guard 50 is fixed in a defined position on the first coupling element 11, in particular in the first end position.

In order to be able to separate the first coupling element 11 completely from the second coupling element 12, the second line opening 56 is dimensioned in such a manner that the second coupling element 12 fits there through. The second coupling element 12 is in particular a positionally fixed connecting piece.

Furthermore, when there is a coupling connection between the first and second coupling elements 11, 12, the plastic shell 51 is openable and closeable by a rotating relative movement of the first and second part-shells 52, 53 in the plane perpendicular to the axial direction A. For this purpose, the first and second part-shells 52, 53 are coupled to each other via a rotary joint 66, which is oriented in the axial direction A, and therefore the first and second part-shells 52, 53 can be swung open and swung shut relative to each other. For ergonomic actuation, the plastic shell 51 has a circumferential grip thickening 61 relative to the axial direction A (see in particular FIG. 1).

The invention is not restricted to one of the embodiments described above, but can be modified in various ways.

All of the features and advantages that emerge from the claims, the description and the drawing, including structural details, spatial arrangements and method steps, may be essential to the invention both on their own and in a wide variety of combinations.

The invention claimed is:

1. A coupling connection device (1) comprising a line coupling connector (10) and a wind guard (50),
   wherein the line coupling connector (10) has a first and second coupling element (11, 12) which are coupled together in an axial direction (A),
   wherein locking means (13) of the first coupling element (11) are in engagement with the second coupling element (12),
   wherein the wind guard (50) has a plastic shell (51) with a first part-shell (52) and a second part-shell (53) which lie opposite each other in a parting plane (T) and surround a receiving space (54) and also form a first and second line opening (55, 56), which connect the receiving space (54) to the surrounding region (U) outside the receiving space (54), and
   wherein the first coupling element (11) is coupled in the receiving space (54) to the first part-shell (52) and/or the second part-shell (53) in an axially fixed manner in the axial direction (A) by means of a form fit,
   wherein actuating means (57, 58) are coupled to the locking means (13) in such a manner that, by means of a movement of the wind guard (50) in the axial direction (A) and away from the second coupling element (12), the locking means (13)
   are actuable and the first coupling element (11) can be separated from the second coupling element (12),
   wherein the wind guard (50) is slidingly mounted on the first coupling element (11) for the distance of an actuating path running in the axial direction (A),
   wherein, in a first end position of the actuating path, the locking means (13) of the first coupling element (11) are in engagement with the second coupling element (12), and wherein, in a second end position of the actuating path, the locking means (13) of the first coupling element (11) are not in engagement with the second coupling element (12), and
   wherein the locking means (13) are configured as holding springs, and the actuating means (57, 58) engage in the holding springs,
   characterized in that
   the actuating means (57, 58) are slidingly mounted along the actuating path on the holding springs which are substantially oriented in the axial direction (A), but form a rising ramp (59) on the outer side in the direction away from the second coupling element (12),
   wherein the holding springs are pivoted about a rocker axis (60) by the actuating means (57, 58) sliding over the ramp (59) and the locking means (13) lift from the second coupling element (12).

2. The coupling connection device (1) as claimed in claim 1, wherein the locking means (13) comprise two opposite holding springs on the first coupling element (11), wherein a first actuating means (57) is arranged on the first part-shell (52) and engages in the first holding spring, and wherein a second actuating means (58) is arranged on the second part-shell (53) and engages in the second holding spring.

3. The coupling connection device (1) as claimed in claim 1, wherein the second coupling element (12) fits through the second line opening (56).

4. The coupling connection device (1) as claimed in claim 1, wherein when a coupling connection exists between the first and second coupling elements (11, 12), the plastic shell (51) is openable and closeable by a linear or rotating relative movement of the first and second part-shells (52, 53) in the plane perpendicular to the axial direction (A).

5. The coupling connection device (1) as claimed in claim 1, wherein the line coupling connector (10) is held in the receiving space (54) at a distance from the first part-shell (52) and the second part-shell (53) by an air gap (L).

6. The coupling connection device (1) as claimed in claim 1, wherein the first and second part-shells (52, 53) are coupled to each other via a rotary joint (66), which is oriented in the axial direction (A), and therefore the first and second part-shells (52, 53) can be swung open and swung shut relative to each other.

7. The coupling connection device (1) as claimed in claim 1, comprising actuable latching means with which the first and second part-shells (52, 53) are sealable to each other.

8. The coupling connection device (1) as claimed in claim 1, wherein the plastic shell (51) has a circumferential grip thickening (61) relative to the axial direction (A).

9. The coupling connection device (1) as claimed in claim 1, wherein the second coupling element (12) is a positionally fixed connecting piece.

10. The coupling connection device (1) as claimed in claim 1, wherein the rocker axis (60) is configured as an elastic rib.

11. The coupling connection device (1) as claimed in claim 1, wherein the ramp (59) has depressions into which the actuating means (57, 58) spring.

12. The coupling connection device (1) as claimed in claim 11, wherein the ramp (59) has depressions into which the actuating means (57, 58) spring.

13. The coupling connection device (1) as claimed in claim 12, wherein at least one depression is provided in the first end position.

14. The coupling connection device (1) as claimed in claim 12, wherein the wind guard is fixed in a defined position on the first coupling element in the first end position by the at least one depression that is provided in the first end position.

15. The coupling connection device (1) as claimed in claim 12, wherein a depression is provided in the second end position.

\* \* \* \* \*